(12) United States Patent
Hayashi et al.

(10) Patent No.: US 9,018,306 B2
(45) Date of Patent: Apr. 28, 2015

(54) CURABLE FLUORINE-CONTAINING POLYMER COMPOSITION

(75) Inventors: Masayuki Hayashi, Ichihara (JP); Eiji Kitaura, Ichihara (JP); Peter Cheshire Hupfield, Carmarthen (GB); Katsuhiko Imoto, Settsu (JP); Masaru Nagato, Settsu (JP)

(73) Assignees: Dow Corning Corporation, Midland, MI (US); Daikin Industries, Ltd., Osaka (JP)

( * ) Notice: Subject to any disclaimer, the term of this patent is extended or adjusted under 35 U.S.C. 154(b) by 749 days.

(21) Appl. No.: 12/664,535

(22) PCT Filed: Jun. 9, 2008

(86) PCT No.: PCT/JP2008/060555
§ 371 (c)(1),
(2), (4) Date: Apr. 20, 2010

(87) PCT Pub. No.: WO2008/153002
PCT Pub. Date: Dec. 18, 2008

(65) Prior Publication Data
US 2010/0210769 A1  Aug. 19, 2010

(30) Foreign Application Priority Data

Jun. 15, 2007 (JP) ................................. 2007-159335

(51) Int. Cl.

| | | |
|---|---|---|
| C09D 5/16 | (2006.01) |
| C08F 8/42 | (2006.01) |
| C08G 18/62 | (2006.01) |
| C08G 18/81 | (2006.01) |
| C08G 18/83 | (2006.01) |
| C08K 5/5415 | (2006.01) |
| C08L 33/16 | (2006.01) |
| C09D 127/16 | (2006.01) |
| C09D 131/02 | (2006.01) |
| C09D 133/16 | (2006.01) |
| C09D 183/10 | (2006.01) |
| C08F 214/28 | (2006.01) |
| C08F 216/14 | (2006.01) |
| C08F 218/10 | (2006.01) |
| C08L 83/04 | (2006.01) |
| C08L 83/10 | (2006.01) |

(52) U.S. Cl.
CPC ............... C09D 5/1675 (2013.01); C08F 8/42 (2013.01); C08F 214/28 (2013.01); C08F 216/1416 (2013.01); C08F 218/10 (2013.01); C08G 18/6279 (2013.01); C08G 18/8108 (2013.01); C08G 18/837 (2013.01); C08K 5/5415 (2013.01); C08L 33/16 (2013.01); C08L 83/04 (2013.01); C08L 83/10 (2013.01); C09D 127/16 (2013.01); C09D 131/02 (2013.01); C09D 133/16 (2013.01); C09D 183/10 (2013.01)

(58) Field of Classification Search
CPC .. C09D 5/1675; C08K 5/5415; C08G 18/837; C08G 18/6279; C08F 214/267
USPC ............... 526/242, 304, 305; 525/104, 326.2, 525/326.3
See application file for complete search history.

(56) References Cited

U.S. PATENT DOCUMENTS 2,568,608 A * 9/1951 Bralley .......................... 526/301
4,241,202 A * 12/1980 Senet et al. .................... 526/73
5,132,366 A * 7/1992 Kashida et al. ............... 525/102

(Continued)

FOREIGN PATENT DOCUMENTS

EP     0582841 A1    2/1994
EP      661358 B1 *  3/2000

(Continued)

OTHER PUBLICATIONS

"Integer", Wikipedia, http://en.wikipedia.org/wiki/integer, May 4, 2012.*

*Primary Examiner* — Nicole M Buie-Hatcher
(74) *Attorney, Agent, or Firm* — Sughrue Mion, PLLC

(57) ABSTRACT

There is provided a curable fluorine-containing polymer composition which is rapidly cured at relatively low temperature by hydrosilylation reaction to form a coating film having not only high hardness and flexibility but also water- and oil-repellency, thereby giving stain-proofing effect for a long period of time, especially maintaining property of removing and wiping-off stain. The curable fluorine-containing polymer composition comprises a fluorine-containing polymer comprising a fluorinated ethylenic monomer unit and an un-fluorinated ethylenic monomer unit, in which a part or the whole of the un-fluorinated ethylenic monomer units are units represented by the formula:

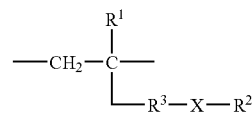

where $R^1$ is hydrogen atom or methyl group; $R^2$ is a hydrocarbon group having ethylenic C=C; X is —C(O)NH— or —C(O)—; $R^3$ is —O—, —O[CH($R^4$)]$_m$O—, —(CH$_2$)$_m$O—, —OC(O)—(CH$_2$)$_n$O— or —(CH$_2$)$_m$OC(O)—(CH$_2$)$_n$O—, where $R^4$ is —H, —OH, —CH$_2$OH or —O—X—$R^2$, a siloxane compound having hydrogen atom bonded to silicon atom, a catalyst for hydrosilylation reaction, and a siloxane compound having no hydrogen atom bonded to silicon atom.

9 Claims, No Drawings

(56) References Cited

U.S. PATENT DOCUMENTS

| | | | |
|---|---|---|---|
| 5,480,930 A * | 1/1996 | Gentle et al. | 524/414 |
| 5,554,689 A | 9/1996 | Langstein et al. | |
| 5,599,883 A * | 2/1997 | Ohsugi et al. | 525/474 |
| 5,837,774 A | 11/1998 | Tarumi et al. | |
| 6,518,371 B1 * | 2/2003 | Fink et al. | 525/478 |
| 6,589,383 B1 * | 7/2003 | Takaoka et al. | 156/313 |
| 6,930,147 B1 * | 8/2005 | Nakagawa et al. | 525/104 |
| 2003/0166795 A1 * | 9/2003 | Hasegawa et al. | 525/479 |
| 2004/0014889 A1 * | 1/2004 | Fukuda et al. | 525/104 |
| 2005/0038187 A1 * | 2/2005 | Mano et al. | 525/101 |
| 2006/0052546 A1 | 3/2006 | Morikawa et al. | |
| 2006/0270791 A1 * | 11/2006 | Kishita et al. | 524/861 |
| 2010/0113700 A1 * | 5/2010 | Imoto et al. | 525/104 |

FOREIGN PATENT DOCUMENTS

| | | |
|---|---|---|
| EP | 1081192 A1 | 3/2001 |
| EP | 1460091 A1 | 9/2004 |
| JP | 06-192524 A | 7/1994 |
| JP | 2004-137509 A | 5/2004 |
| WO | 2004/050758 A1 | 6/2004 |
| WO | WO 2008044765 A1 * | 4/2008 |

* cited by examiner

CURABLE FLUORINE-CONTAINING POLYMER COMPOSITION

TECHNICAL FIELD

The present invention relates to a curable fluorine-containing polymer composition curing by hydrosilylation reaction.

BACKGROUND ART

There are known curable fluorine-containing polymer compositions comprising a fluorine-containing polymer having hydroxyl group and obtained by copolymerization of a fluorinated ethylenic monomer with an un-fluorinated ethylenic monomer (a part or the whole of the un-fluorinated ethylenic monomers are un-fluorinated ethylenic monomers having hydroxyl group) and a curing agent such as an isocyanate, amino resin, acid anhydride, polyepoxy compound or isocyanate group-containing silane compound. However, these curable fluorine-containing polymer compositions have problems that it takes time for curing the composition and the composition must be heated to high temperature.

JP6-192524A proposes a curable fluorine-containing polymer composition comprising a fluorine-containing polymer having alkenyl group obtained by copolymerization of a fluorinated ethylenic monomer, an un-fluorinated ethylenic monomer and a monomer having at least two alkenyl groups such as triallyl isocyanurate, organopolysiloxane having hydrogen atom bonded to silicon atom, and a catalyst for hydrosilylation reaction.

Also, WO 2004/050758 proposes a curable fluorine-containing polymer composition, comprising a fluorine-containing polymer having methylene group such as a vinylidene fluoride (VDF) polymer or a copolymer of ethylene and fluorine-containing olefin, by introducing vinyl group or hydrogen atom bonded to silicon atom to an end of main chain or an end of side chain of the fluorine-containing polymer and by combining with a crosslinking agent to be capable of being cured by hydrosilylation reaction.

A curable fluorine-containing polymer composition disclosed in JP6-192524A has a problem that it is not suitable for practical use because mechanical strength of a cured article obtained by curing the composition is significantly small.

The curable fluorine-containing polymer composition disclosed in WO 2004/050758 comprises, as a main component, a fluorine-containing polymer substantially containing vinylidene fluoride (VDF) as a main unit, and WO 2004/050758 does not disclose a composition to be cured by hydrosilylation reaction of a fluorine-containing polymer prepared by copolymerizing a fluorinated ethylenic monomer with an un-fluorinated ethylenic monomer to introduce alkenyl group to a side chain of the polymer.

DISCLOSURE OF INVENTION

It is an object of the present invention to provide a curable fluorine-containing polymer composition which is rapidly cured at relatively low temperature by hydrosilylation reaction to form a coating film having not only high hardness and flexibility but also water- and oil-repellency, thereby giving stain-proofing effect for a long period of time, especially maintaining property of removing and wiping-off stain.

The curable fluorine-containing polymer composition of the present invention is characterized by comprising:
(A) a fluorine-containing polymer comprising recurring unit derived from a fluorinated ethylenic monomer and recurring unit derived from an un-fluorinated ethylenic monomer, in which a part or the whole of the recurring units derived from the un-fluorinated ethylenic monomer are recurring unit represented by the formula:

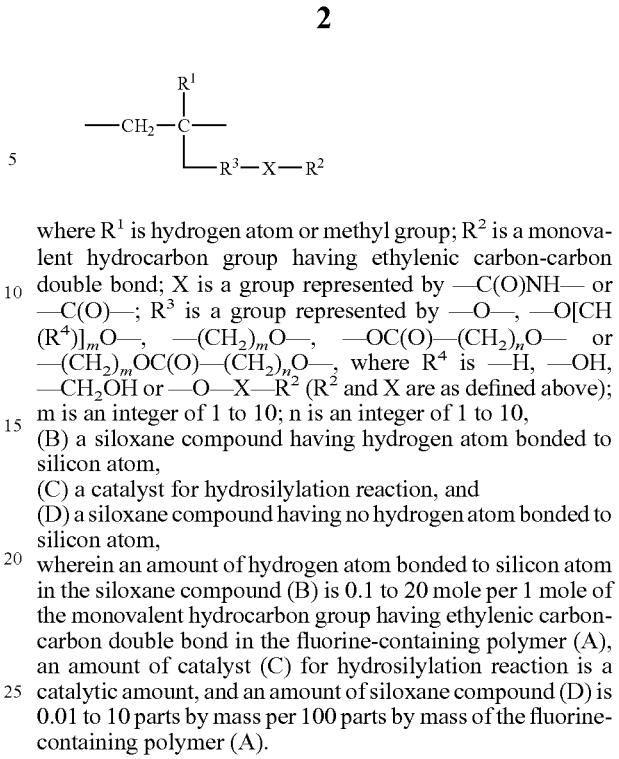

where $R^1$ is hydrogen atom or methyl group; $R^2$ is a monovalent hydrocarbon group having ethylenic carbon-carbon double bond; X is a group represented by —C(O)NH— or —C(O)—; $R^3$ is a group represented by —O—, —O[CH($R^4$)]$_m$O—, —(CH$_2$)$_m$O—, —OC(O)—(CH$_2$)$_n$O— or —(CH$_2$)$_m$OC(O)—(CH$_2$)$_n$O—, where $R^4$ is —H, —OH, —CH$_2$OH or —O—X—$R^2$ ($R^2$ and X are as defined above); m is an integer of 1 to 10; n is an integer of 1 to 10,
(B) a siloxane compound having hydrogen atom bonded to silicon atom,
(C) a catalyst for hydrosilylation reaction, and
(D) a siloxane compound having no hydrogen atom bonded to silicon atom,
wherein an amount of hydrogen atom bonded to silicon atom in the siloxane compound (B) is 0.1 to 20 mole per 1 mole of the monovalent hydrocarbon group having ethylenic carbon-carbon double bond in the fluorine-containing polymer (A), an amount of catalyst (C) for hydrosilylation reaction is a catalytic amount, and an amount of siloxane compound (D) is 0.01 to 10 parts by mass per 100 parts by mass of the fluorine-containing polymer (A).

BEST MODE FOR CARRYING OUT THE INVENTION

The fluorine-containing polymer of component (A) is characterized by comprising recurring unit derived from a fluorinated ethylenic monomer and recurring unit derived from an un-fluorinated ethylenic monomer, in which a part or the whole of the recurring units derived from the un-fluorinated ethylenic monomer are recurring unit represented by the formula:

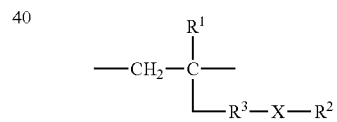

In the formula, $R^1$ is hydrogen atom or methyl group.

Also, in the formula, $R^2$ is a monovalent hydrocarbon group having ethylenic carbon-carbon double bond. Examples thereof are, for instance, alkenyl groups such as vinyl group, allyl group, isopropenyl group, butenyl group, pentenyl group, hexenyl group, heptenyl group and octenyl group; aryl groups having alkenyl group such as vinyl phenyl group and isopropenyl phenyl group; and aralkyl groups having alkenyl group such as vinyl phenyl methyl group and a group represented by the formula:

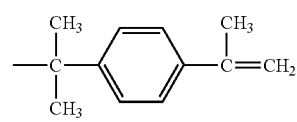

Also, in the formula, X is a group represented by —C(O)NH— or —C(O)—. Also, in the formula, $R^3$ is a group represented by —O—, —O[CH($R^4$)]$_m$O—, —(CH$_2$)$_m$O—, —OC(O)—(CH$_2$)$_n$O— or —(CH$_2$)$_m$OC(O)—(CH$_2$)$_n$O—. In this formula, $R^4$ is a group represented by —H, —OH, —CH$_2$OH or —O—X—R$^2$ (R$^2$ and X are as defined above). Also, in the formula, m is an integer of 1 to 10, and n is an integer of 1 to 10.

Examples of such a recurring unit are, for instance the following units.

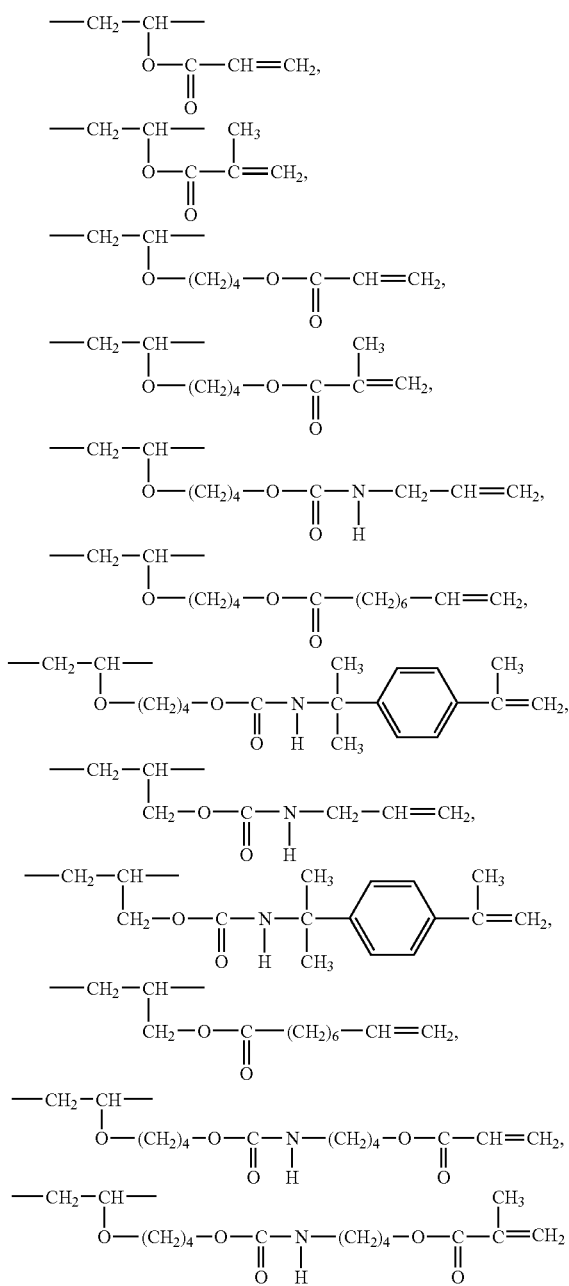

Also, in the fluorine-containing polymer of component (A), examples of the recurring units derived from the fluorinated ethylenic monomer are one or more kinds of recurring units derived from perhalo olefins such as tetrafluoroethylene (TFE), perfluoro(alkyl vinyl ether) (PAVE), hexafluoropropylene (HFP) and chlorotrifluoroethylene (CTFE) and fluoro olefins such as trifluoroethylene (TrFE), vinylidene fluoride (VdF) and ethylene fluoride, and preferable is recurring unit derived from at least one kind of monomer selected from the group consisting of tetrafluoroethylene, hexafluoropropylene, chlorotrifluoroethylene (CTFE) and trifluoroethylene. Especially from the viewpoint of weather resistance, solvent resistance and chemical resistance, perhalo olefins are preferable, and especially from the viewpoint of weather resistance, solvent resistance, chemical resistance and corrosion resistance, perfluoro olefins are preferable. From the viewpoint of weather resistance, solvent resistance and chemical resistance, an amount of recurring unit derived from fluoro olefin is preferably 1 to 50% by mole, further preferably 10 to 50% by mole, especially preferably 20 to 50% by mole based on the whole recurring units constituting the fluorine-containing polymer (A).

The fluorine-containing polymer (A) can be obtained by reaction of a fluorine-containing polymer (hereinafter referred to as "starting fluorine-containing polymer (A1)") comprising recurring unit derived from a fluorinated ethylenic monomer and recurring unit derived from an un-fluorinated ethylenic monomer, in which a part or the whole of the recurring units derived from the un-fluorinated ethylenic monomer are recurring unit represented by the formula (A1):

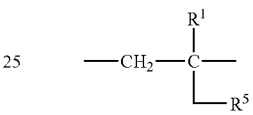

with a compound (hereinafter referred to as "starting compound (A2)") represented by the formula (A2): R$^2$—Y.

In the starting fluorine-containing polymer (A1), R$^1$ in the formula (A1) is hydrogen atom or methyl group; R$^5$ is a group represented by —OH, —O[CH(R$^6$)]$_m$OH, —(CH$_2$)$_m$OH, —OC(O)—(CH$_2$)$_n$OH or —(CH$_2$)$_m$OC(O)—(CH$_2$)$_n$OH, where R$^6$ is —H, —OH or —CH$_2$OH; m is an integer of 1 to 10; n is an integer of 1 to 10.

In the starting fluorine-containing polymer (A1), it is preferable that the recurring unit represented by the formula (A1) is a vinyl monomer having hydroxyl group such as hydroxyalkyl vinyl ether or hydroxyalkyl allyl ether; a (meth)acrylic monomer having hydroxyl group such as hydroxyalkyl methacrylate or hydroxyalkyl acrylate; a monomer having hydroxyl group such as hydroxyalkyl vinyl ester. Especially, among vinyl monomers having hydroxyl group, examples of hydroxyalkyl vinyl ether are hydroxybutyl vinyl ether, hydroxypropyl vinyl ether and hydroxyethyl vinyl ether, and preferable examples of hydroxyalkyl allyl ether are 2-hydroxyethyl allyl ether, 4-hydroxybutyl allyl ether and glycerol monoallyl ether. From the viewpoint of polymerization reactivity with fluoro olefin, hydroxyalkyl vinyl ether, hydroxyalkyl allyl ether and hydroxyalkyl vinyl ester are, especially preferable.

In addition, in the starting fluorine-containing polymer (A1), examples of the recurring unit derived from the fluorinated ethylenic monomer are the same as those exemplified above. This fluorine-containing polymer may comprise a recurring unit other than the recurring unit derived from the fluorinated ethylenic monomer and the recurring unit derived from the un-fluorinated ethylenic monomer having hydroxyl group. Examples of such a recurring unit are those derived from alkyl vinyl ethers such as methyl vinyl ether, ethyl vinyl ether, propyl vinyl ether, butyl vinyl ether, n-hexyl vinyl ether, n-octyl vinyl ether, 2-ethylhexyl vinyl ether, benzyl vinyl ether, octadecyl vinyl ether and cyclohexyl vinyl ether; olefins such as ethylene, propylene, n-butene, isobutylene, 2-butene, cyclobutene, 3-methyl-1-butene, cyclopentene, cyclohexane, cycloheptene and cis-cyclooctene; vinyl esters such as vinyl acetate, vinyl formate, vinyl pivalate, vinyl caproate, VeoVa9 (trade mark) (trade name of Shell, U.S.A.), VeoVa10 (trade mark) (trade name of Shell, U.S.A.), vinyl caprylate, vinyl laurate, vinyl myristate, vinyl palmitate, vinyl stearate, vinyl oleate, vinyl benzoate, vinyl p-t-butyl benzoate and vinyl cyclohexyl carboxylate.

A process for preparing the starting fluorine-containing polymer (A1) is not limited particularly, and for example, can be prepared by usual radical polymerization method. Specifically, a monomer giving the recurring unit of the formula (A1) is usually polymerized by an emulsion, suspension or solution polymerization method using a polymerization solvent and a polymerization initiator. A polymerization temperature is usually from 0° C. to 150° C., preferably from 5° C. to 95° C. in any of polymerization methods. A polymerization pressure is usually from 0.1 to 10 MPaG (1 to 100 kgf/cm$^2$G) in any of polymerization methods.

A number average molecular weight of the starting fluorine-containing polymer (A1) is from 1,000 to 1,000,000, preferably from 3,000 to 50,000 when measured by gel permeation chromatography (GPC) using tetrahydrofuran as an eluate. A glass transition temperature ($2^{nd}$ run) thereof determined using a differential scanning calorimeter (DSC) is from 10° to 60° C., preferably from 20° to 40° C.

In an emulsion polymerization method, water is used as a polymerization solvent, and in a suspension polymerization method, for example, water, tert-butanol, 1,1,2-trichloro-1,2,2-trifluoroethane, 1,2-dichloro-1,1,2,2-tetrafluoroethane or mixtures thereof is used as a polymerization solvent. Examples of a polymerization solvent used in a solution polymerization method are esters such as methyl acetate, ethyl acetate, propyl acetate, n-butyl acetate and tert-butyl acetate; ketones such as acetone, methyl ethyl ketone and cyclohexanone; aliphatic hydrocarbons such as hexane, cyclohexane, octane, nonane, decane, undecane, dodecane and mineral spirit; aromatic hydrocarbons such as benzene, toluene, xylene, naphthalene and solvent naphtha; alcohols such as methanol, ethanol, tert-butanol, iso-propanol and ethylene glycol monoalkyl ether; cyclic ethers such as tetrahydrofuran, tetrahydropyran and dioxane; dimethyl sulfoxide and mixtures thereof.

Examples of usable polymerization initiator are, for instance, persulfates such as ammonium persulfate and potassium persulfate (further reducing agents such as sodium hydrogensulfite, sodium disulfite, cobalt naphthenate and dimethyl aniline can be used together according to necessity); redox initiators comprising an oxidizing agent (for example, ammonium peroxide and potassium peroxide), a reducing agent (for example, sodium sulfite) and a transition metal salt (for example, iron sulfate); diacyl peroxides such as acetyl peroxide and benzoyl peroxide; dialkoxycarbonyl peroxides such as isopropoxycarbonyl peroxide and tert-butoxycarbonyl peroxide; ketone peroxides such as methyl ethyl ketone peroxide and cyclohexanone peroxide; hydroperoxides such as hydrogen peroxide, tert-butyl hydroperoxide and cumene hydroperoxide; dialkyl peroxides such as di-tert-butyl peroxide and dicumyl peroxide; alkylperoxy esters such as tert-butyl peroxyacetate and tert-butyl peroxypivalate; and azo compounds such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'azobis (isobutyrate), 2,2'-azobis[2-(hydroxymethyl)propionitrile] and 4,4'-azobis(4-cyanopentenoic acid).

The starting compound (A2) reacts with hydroxyl group in the starting fluorine-containing polymer (A1), thereby introducing a monovalent hydrocarbon group having ethylenic carbon-carbon double bond to the obtained fluorine-containing polymer (A).

In the formula of this starting compound (A2), R$^2$ is a monovalent hydrocarbon group having ethylenic carbon-carbon double bond, and examples thereof are the same as those exemplified above.

In addition, in the formula (A2), Y is a group represented by —NCO, —C(O)Br or —C(O)Cl. Examples of such a compound are unsaturated fatty acid halides such as acrylyl chloride, acrylyl bromide, crotonoyl chloride, crotonoyl bromide, undecylenoyl chloride and undecylenoyl bromide; and isocyanate compounds such as allyl isocyanate and 1,1-dimethyl-1-vinylphenylmethyl isocyanate. Preferable is an isocyanate compound, and especially preferable is allyl isocyanate.

In the above-mentioned reaction, an amount of the starting compound (A2) having a group being reactable with hydroxyl group is from 0.01 to 10 mole, especially preferably from 0.05 to 2 mole per one mole of hydroxyl group in the starting fluorine-containing polymer (A1).

The thus prepared fluorine-containing polymer of component (A) is preferably a fluorine-containing polymer comprising a recurring unit represented by the formula (1):

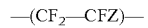

where Z is a group represented by —H, —Cl, —F or —CF$_3$, a recurring unit represented by the formula (2):

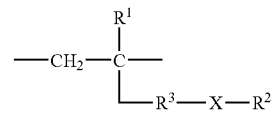

where R$^1$ is hydrogen atom or methyl group; R$^2$ is a monovalent hydrocarbon group having ethylenic carbon-carbon double bond; X is a group represented by —C(O)NH— or —C(O)—; R$^3$ is a group represented by —O—, —O[CH(R$^4$)]$_m$O—, —(CH$_2$)$_m$O—, —OC(O)—(CH$_2$)$_n$O— or —(CH$_2$)$_m$OC(O)—(CH$_2$)$_n$O—, where R$^4$ is —H, —OH, —CH$_2$OH or —O—X—R$^2$ (R$^2$ and X are as defined above); m is an integer of 1 to 10; n is an integer of 1 to 10, a recurring unit represented by the formula (3):

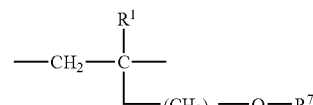

R$^1$ is hydrogen atom or methyl group; a is 0 or 1; R$^7$ is hydrogen atom or a substituted or un-substituted monovalent hydrocarbon group having no ethylenic carbon-carbon double bond, a recurring unit represented by the formula (4):

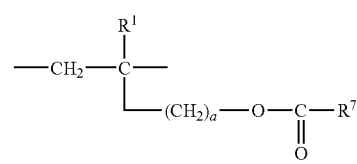

where R$^1$ is hydrogen atom or methyl group; a is 0 or 1; R$^7$ is hydrogen atom or a substituted or un-substituted monovalent hydrocarbon group having no ethylenic carbon-carbon double bond, a recurring unit represented by the formula (5):

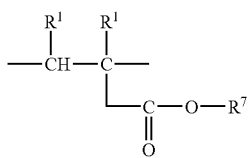

where $R^1$s are the same or different and each is hydrogen atom or methyl group; $R^7$ is hydrogen atom or a substituted or un-substituted monovalent hydrocarbon group having no ethylenic carbon-carbon double bond, and
a recurring unit represented by the formula (6):

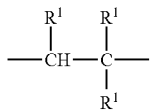

where $R^1$s are the same or different and each is hydrogen atom or methyl group. In the formulas, $R^7$ is hydrogen atom or a substituted or un-substituted monovalent hydrocarbon group having no ethylenic carbon-carbon double bond, and examples thereof are alkyl groups such as methyl group, ethyl group, propyl group, butyl group, pentyl group, heptyl group and octyl group; aryl groups such as phenyl group, tolyl group and xylyl group; aralkyl groups such as benzyl group and phenethyl group; chloroalkyl groups such as chloromethyl group and chloromethyl group; chloroaryl groups such as chlorobenzyl group; and hydroxyalkyl groups such as hydroxyethyl group.

Examples of the monomer giving the recurring unit (1) of the formula (1) are tetrafluoroethylene (TFE), hexafluoropropylene (HFP), chlorotrifluoroethylene (CTFE) and trifluoroethylene (TrFE).

Examples of the recurring units (2) represented by the formula (2) are the recurring unit explained above in the formula (2) and preferable examples thereof, and the above-mentioned method of introducing an ethylenic carbon-carbon double bond can also be adopted.

Examples of the monomer giving the recurring unit (3) of the formula (3) are vinyl ethers, for instance, alkyl vinyl ethers such as methyl vinyl ether, ethyl vinyl ether, n-propyl vinyl ether, isopropyl vinyl ether, n-butyl vinyl ether, isobutyl vinyl ether, sec-butyl vinyl ether, tert-butyl vinyl ether, isoamyl vinyl ether, n-hexyl vinyl ether, cyclohexyl vinyl ether, n-octyl vinyl ether, 2-ethylhexyl vinyl ether, n-decyl vinyl ether, cetyl vinyl ether, octadecyl vinyl ether, 2-chloroethyl vinyl ether and 2,2,2-trifluoroethyl vinyl ether. Examples of aromatic vinyl ethers are phenyl vinyl ether, o-cresyl vinyl ether, p-cresyl vinyl ether, p-chlorophenyl vinyl ether, α-naphthyl vinyl ether and β-naphthyl vinyl ether. Examples of alkyl allyl ethers are methyl allyl ether, ethyl allyl ether, butyl allyl ether and cyclohexyl allyl ether. Examples of hydroxyalkyl vinyl ethers are hydroxybutyl vinyl ether, hydroxypropyl vinyl ether and hydroxyethyl vinyl ether. Examples of hydroxyalkyl allyl ethers are 2-hydroxyethyl allyl ether, 4-hydroxybutyl allyl ether and glycerol monoallyl ether.

Examples of the monomer giving the recurring unit (4) of the formula (4) are vinyl esters such as vinyl acetate, vinyl formate, vinyl pivalate, vinyl caproate, vinyl caprylate, VeoVa9 (trade mark) (vinyl ester of versatic acid comprising carboxylic acid having 9 carbon atoms and being available from Shell Chemical), VeoVa10 (trade mark) (vinyl versatate comprising carboxylic acid having 10 carbon atoms and being available from Shell Chemical), vinyl caprate, vinyl laurate, vinyl myristate, vinyl palmitate, vinyl stearate, vinyl oleate, vinyl benzoate, vinyl p-t-butyl benzoate and vinyl cyclohexyl carboxylate. From the viewpoint of reactivity, weather resistance, chemical stability, compatibility with an additive and compatibility with a curing agent, vinyl pivalate, vinyl benzoate, vinyl p-t-butyl benzoate and VeoVa9 (trade mark) are preferable.

Examples of the monomer giving the recurring unit (5) of the formula (5) are, for instance, lower alkyl esters of (meth) acrylic acid such as methyl acrylate, n-butyl acrylate, methyl methacrylate, ethyl methacrylate and n-butyl methacrylate; alkyl esters of (meth)acrylic acid having 4 to 10 carbon atoms such as 2-ethylhexyl acrylate, 2-ethylhexyl methacrylate, cyclohexyl acrylate and cyclohexyl methacrylate; unsaturated carboxylic acids such as acrylic acid, methacrylic acid, maleic acid and crotonic acid; and monomers having hydroxyl group such as hydroxyethyl acrylate, hydroxyethyl methacrylate, hydroxypropyl acrylate and hydroxypropyl methacrylate.

Examples of the monomer giving the recurring unit (6) of the formula (6) are, for instance, ethylene, propylene, isobutylene and 2-butene, and from the viewpoint of solubility in an organic solvent, optical properties and electrical properties, propylene and isobutylene are preferable.

It is preferable that when the amount of the whole recurring units constituting the fluorine-containing polymer (A) is assumed to be 100% by mole, the recurring units (1) is contained in an amount of 10 to 50% by mole, the recurring units (2) is contained in an amount of 1 to 50% by mole, the recurring units (3) is contained in an amount of 0 to 89% by mole, the recurring units (4) is contained in an amount of 0 to 89% by mole, the recurring units (5) is contained in an amount of 0 to 89% by mole, and the recurring units (6) is contained in an amount of 0 to 89% by mole.

As mentioned above, the recurring units (3) to (6) are optional components. However, at least one of them is contained in the fluorine-containing polymer (A). Nonlimiting examples of preferable combination of these recurring units in the fluorine-containing polymer are as follows.
(1)/(2)/(3) (10 to 50/1 to 50/0 to 89 in percent by mole ratio)
(1)/(2)/(4) (10 to 50/1 to 50/0 to 89 in percent by mole ratio)
(1)/(2)/(5) (10 to 50/1 to 50/0 to 89 in percent by mole ratio)
(1)/(2)/(6) (10 to 50/1 to 50/0 to 89 in percent by mole ratio)
(1)/(2)/(3)/(4) (10 to 50/1 to 50/1 to 88/1 to 88 in percent by mole ratio)
(1)/(2)/(4)/(6) (10 to 50/1 to 50/1 to 88/1 to 88 in percent by mole ratio)

A number average molecular weight of the fluorine-containing polymer is from 1,000 to 1,000,000, preferably from 3,000 to 50,000 when measured by gel permeation chromatography (GPC) using tetrahydrofuran as an eluate. A glass transition temperature ($2^{nd}$ run) thereof determined using a differential scanning calorimeter (DSC) is from −10° C. to 120° C., preferably from 0° C. to 100° C. When the molecular weight is too small, in the case of the use for a coating composition, hardness of the obtained coating film becomes insufficient, and when the molecular weight is too large, a viscosity of a composition is increased and handling thereof is difficult.

Next, the siloxane compound of component (B) functions as a crosslinking agent in the curable fluorine-containing polymer composition of the present invention, and is featured by having hydrogen atom bonded to silicon atom (hydrogen atom bonded directly to silicon atom).

Example of the siloxane compound of component (B) is a siloxane compound having a diorganosiloxy group (b1) represented by the formula (b1):

$$-O-SiR^8_2H$$

where $R^8$ is a monovalent hydrocarbon group having 1 to 10 carbon atoms and having no ethylenic carbon-carbon double bond.

Examples of the diorganosiloxy group (b1) are, for instance, a group represented by the formula:

$$-O-Si(CH_3)_2H$$

a group represented by the formula:

$$-O-Si(C_6H_5)_2H$$

a group represented by the formula:

$$-O-Si(CH_3)(C_6H_5)H$$

and a group represented by the formula:

$$-O-Si(C_2H_5)_2H,$$

and especially from the viewpoint of satisfactory reactivity in hydrosilylation reaction, a group represented by the formula:

$$-O-Si(CH_3)_2H$$

is preferable.

Examples of the siloxane compound (B) are a siloxane compound (B1) represented by the formula (B1):

$$R^9_b Si(OR^{10})_{4-b}$$

wherein $R^9$ is a substituted or un-substituted monovalent hydrocarbon group, an organic group having (meth)acryl group or an organic group having epoxy group; $R^{10}$ is a monovalent hydrocarbon group having no ethylenic carbon-carbon double bond or a diorganosilyl group (b2) represented by the formula (b2):

$$-SiR^8_2H$$

where $R^8$ is a monovalent hydrocarbon group having 1 to 10 carbon atoms and having no ethylenic carbon-carbon double bond; at least two $R^{10}$s in one molecule are the above-mentioned diorganosilyl groups (b2); b is 0 or an integer of 1 to 2, a siloxane compound (B2) represented by the formula (B2):

$$R^9_{c1})(R^{10}O)_{3-c1}Si-R^{11}-SiR^9_{c2}(OR^{10})_{3-c2}$$

where $R^9$ is a substituted or un-substituted monovalent hydrocarbon group, an organic group having (meth)acryl group or an organic group having epoxy group; $R^{10}$ is a monovalent hydrocarbon group having no ethylenic carbon-carbon double bond or a diorganosilyl group (b2) represented by the formula (b2):

$$-SiR^8_2H$$

where $R^8$ is a monovalent hydrocarbon group having 1 to 10 carbon atoms and having no ethylenic carbon-carbon double bond; at least two $R^{10}$s in one molecule are the above-mentioned diorganosilyl groups (b2); $R^{11}$ is a divalent organic group; c1 is 0 or an integer of 1 to 3; c2 is 0 or an integer of 1 to 3; both of c1 and c2 are not 3 at the same time, or a siloxane compound (B3) represented by the average unit formula (B3):

$$(HR^8_2SiO_{1/2})_d(R^8SiO_{3/2})_e(SiO_{4/2})_f$$

where $R^8$ is a monovalent hydrocarbon group having 1 to 10 carbon atoms and having no ethylenic carbon-carbon double bond; d is a positive number; e is 0 or a positive number; f is 0 or a positive number; d/(e+f) is from 0.5 to 1.9. In the formulas, $R^8$ is a monovalent hydrocarbon group having 1 to 10 carbon atoms and having no ethylenic carbon-carbon double bond, and examples thereof are alkyl groups such as methyl group, ethyl group, propyl group, butyl group, pentyl group and hexyl group; aryl groups such as phenyl group, tolyl group and xylyl group; and aralkyl groups such as benzyl group and phenethyl group. Also, in the formulas, $R^9$ is a substituted or un-substituted monovalent hydrocarbon group, an organic group having (meth)acryl group or an organic group having epoxy group, and examples of a substituted or un-substituted monovalent hydrocarbon group of $R^9$ are alkyl groups such as methyl group, ethyl group, propyl group, butyl group, pentyl group and hexyl group; alkenyl groups such as vinyl group, allyl group and pentenyl group; aryl groups such as phenyl group, tolyl group and xylyl group; and aralkyl groups such as benzyl group and phenethyl group. Examples of an organic group having (meth)acryl group of $R^9$ are 3-methacryloxypropyl group and 3-acryloxypropyl group, and examples of an organic group having epoxy group of $R^9$ are 3-glycidoxypropyl group, 2-(3,4-epoxycyclohexyl)-ethyl group and 4-oxiranylbutyl group. In the formulas, $R^{10}$ is a monovalent hydrocarbon group having no ethylenic carbon-carbon double bond, and examples thereof are the same as those of $R^8$.

Preferable examples of the siloxane compound (B1) are a siloxane compound represented by the formula:

$$CH_3Si\{OSi(CH_3)_2H\}_3,$$

a siloxane compound represented by the formula:

$$CH_3(C_6H_5)Si\{OSi(CH_3)_2H\}_2,$$

a siloxane compound represented by the formula:

$$C_3H_7Si\{OSi(CH_3)_2H\}_3,$$

a siloxane compound represented by the formula:

$$C_4H_9Si\{OSi(CH_3)_2H\}_3,$$

a siloxane compound represented by the formula:

$$C_6H_{13}Si\{OSi(CH_3)_2H\}_3,$$

a siloxane compound represented by the formula:

$$C_8H_{17}Si\{OSi(CH_3)_2H\}_3,$$

a siloxane compound represented by the formula:

$$C_6H_5Si\{OSi(CH_3)_2H\}_3,$$

a siloxane compound represented by the formula:

$$(C_6H_5)_2Si\{OSi(CH_3)_2H\}_2,$$

a siloxane compound represented by the formula:

$$CF_3C_2H_4Si\{OSi(CH_3)_2H\}_3,$$

a siloxane compound represented by the formula:

$$C_8F_{17}C_2H_4Si\{OSi(CH_3)_2H\}_3,$$

a siloxane compound represented by the formula:

$$CH_2=C(CH_3)-C(=O)-O-(CH_2)_3-Si\{OSi(CH_3)_2H\}_3,$$

a siloxane compound represented by the formula:

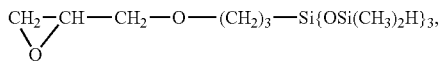

a siloxane compound represented by the formula:

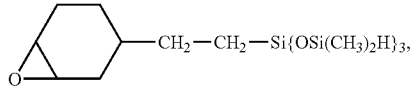

a siloxane compound represented by the formula:

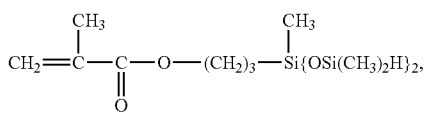

a siloxane compound represented by the formula:

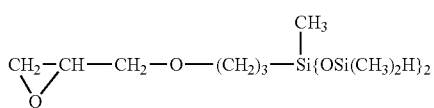

and
a siloxane compound represented by the formula:

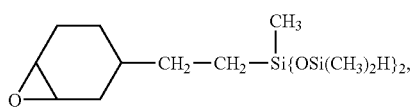

and the siloxane compound represented by the formula:

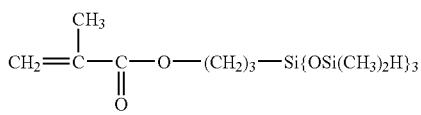

is preferable from the viewpoint of excellent compatibility with the component (A).

Examples of the siloxane compound (B2) are a siloxane compound represented by the formula:

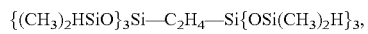

a siloxane compound represented by the formula:

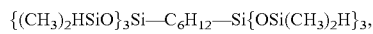

a siloxane compound represented by the formula:

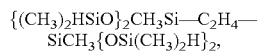

a siloxane compound represented by the formula:

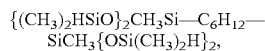

a siloxane compound represented by the formula:

a siloxane compound represented by the formula:

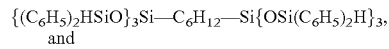

and
a siloxane compound represented by the formula:

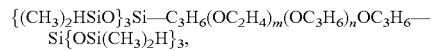

wherein m is an integer of not less than 0; n is an integer of not less than 0; m and n are not 0 at the same time. From the viewpoint of excellent compatibility with the component (A), the siloxane compound represented by the formula:

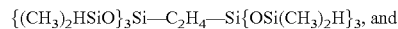 and the siloxane compound represented by the formula:

are preferable.

Examples of the siloxane compound (B3) are a siloxane compound represented by the average unit formula:

a siloxane compound represented by the average unit formula:

a siloxane compound represented by the average unit formula:

a siloxane compound represented by the average unit formula:

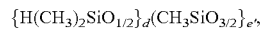

a siloxane compound represented by the average unit formula:

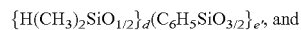, and a siloxane compound represented by the average unit formula:

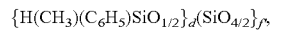

(in the above-mentioned formulas, d, e' and f' are all positive numbers). From the viewpoint of excellent compatibility with the component (A), the siloxane compound represented by the average unit formula:

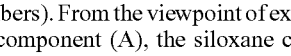

(in the formula, d and f' are positive numbers) is preferable.

The siloxane compound (B) is contained in the composition of the present invention in such an amount that an amount of hydrogen atom bonded to silicon atom in the siloxane compound (B) is from 0.1 to 20 mole, especially preferably from 0.1 to 10 mole per one mole of monovalent hydrocarbon group having ethylenic carbon-carbon double bond in the fluorine-containing polymer (A). This is because if the amount of component (B) is less than the lower limit of the above-mentioned range, there is a tendency that the obtained composition is not cured sufficiently, and on the contrary, if the amount exceeds the upper limit, mechanical properties of the obtained cured article tend to be lowered.

Next, the catalyst for hydrosilylation reaction of component (C) is a catalyst for accelerating the hydrosilylation reaction of the composition of the present invention. Examples of such a catalyst are a platinum catalyst, a palladium catalyst, a rhodium catalyst, a ruthenium catalyst and an iridium catalyst, and preferable is a platinum catalyst since it is obtainable relatively easily. Examples of a platinum catalyst are chloroplatinic acid, alcohol-modified chloroplatinic acid, carbonyl complex of platinum, olefin complex of platinum and alkenylsiloxane complex of platinum.

In the composition of the present invention, the amount of catalyst (C) for hydrosilylation reaction is a catalytic amount for accelerating the curing of the composition of the present invention, and specifically, an amount in mass unit of catalytic metal in the composition of the present invention is within a range preferably from 0.1 to 1,000 ppm, especially preferably from 1 to 500 ppm. This is because if the amount of component (C) is less than the lower limit of the above-mentioned range, there is a tendency that curing of the obtained composition cannot be accelerated sufficiently, and on the contrary, if the amount exceeds the upper limit, there is a problem that coloration of the obtained cured article occurs.

Next, the siloxane compound of component (D) having no hydrogen atom bonded to silicon atom is a component for making a water- and oil-repellent surface of a coating film obtained by curing the composition of the present invention, thereby maintaining stain-proofing effect for a long period of time, especially property of removing and wiping-off stain. A viscosity of the component (D) is not limited particularly, and its viscosity at 25° C. is preferably not less than 0.5 mPa·s, more preferably not less than 5 mPa·s, further preferably not less than 10 mPa·s, especially preferably not less than 50 mPa·s, and preferably not more than 1,000,000 mPa·s, more preferably not more than 500,000 mPa·s, further preferably not more than 100,000 mPa·s, especially preferably not more than 10,000 mPa·s. A molecular structure of such component (D) is not limited particularly, and it is preferable that the component (D) has a diorganosiloxane unit represented by the formula: $R^8_2SiO_{2/2}$. In the formula, $R^8$ is a monovalent hydrocarbon group having 1 to 10 carbon atoms and having no ethylenic carbon-carbon double bond, and the same groups as above are exemplified as examples thereof. The component (D) may contain other siloxane unit having no hydrogen atom bonded to silicon atom, and there is exemplified, as such a siloxane unit, at least one unit selected from the group consisting of a triorganosiloxane unit represented by the formula:

a triorganosiloxane unit represented by the formula:

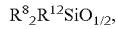

a diorganosiloxane unit represented by the formula:

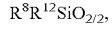

a monoorganosiloxane unit represented by the formula:

a monoorganosiloxane unit represented by the formula:

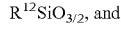

a siloxane unit having the formula:

Especially, the component (D) is preferably a siloxane compound comprising a diorganosiloxane unit represented by the formula: $R^8_2SiO_{2/2}$ and a triorganosiloxane unit represented by the formula: $R^8_2R^{12}SiO_{1/2}$, or a siloxane compound comprising a diorganosiloxane unit represented by the formula: $R^8_2SiO_{2/2}$, a diorganosiloxane unit represented by the formula: $R^8R^{12}SiO_{2/2}$, and a triorganosiloxane unit represented by the formula: $R^8_2R^{12}SiO_{1/2}$. In the formulas, $R^8$ is a monovalent hydrocarbon group having 1 to 10 carbon atoms and having no ethylenic carbon-carbon double bond, and the same groups as above are exemplified. Also, in the formulas, $R^{12}$ is a substituted or un-substituted monovalent hydrocarbon group, an organic group having (meth)acryl group, an organic group having epoxy group, hydroxyl group, an organic group having carboxyl group or an organic group having polyoxyalkylene group. Examples of a substituted or un-substituted monovalent hydrocarbon group of $R^{12}$ are alkyl groups such as methyl group, ethyl group, propyl group, butyl group, pentyl group and hexyl group; alkenyl groups such as vinyl group, allyl group, pentenyl group and hexenyl group; aryl groups such as phenyl group, tolyl group and xylyl group; and aralkyl groups such as benzyl group and phenethyl group, examples of an organic group having (meth) acryl group of $R^{12}$ are 3-methacryloxypropyl group and 3-acryloxypropyl group, examples of an organic group having epoxy group of $R^{12}$ are 3-glycidoxypropyl group, 2-(3,4-epoxycyclohexyl)-ethyl group and 4-oxiranylbutyl group, examples of an organic group having carboxyl group of $R^{12}$ are carboxydecyl group and carboxyundecyl group, and examples of an organic group having polyoxyalkylene group of $R^{12}$ are a group having polyoxyethylene group bonded to the end of an alkylene group and a group having polyoxyethylene-polyoxypropylene group bonded to the end of an alkylene group.

Examples of such a component (D) are a siloxane compound represented by the general formula (D1):

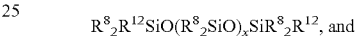

a siloxane compound represented by the general formula (D2):

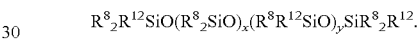

In the formulas, $R^8$ is a monovalent hydrocarbon group having 1 to 10 carbon atoms and having no ethylenic carbon-carbon double bond, and the same groups as above are exemplified. Also, $R^{12}$ is a substituted or un-substituted monovalent hydrocarbon group, an organic group having (meth)acryl group, an organic group having epoxy group, hydroxyl group, an organic group having carboxyl group or an organic group having polyoxyalkylene group, and the same groups as above are exemplified. In addition, each of x and y is a positive integer of not less than 1, preferably a positive integer assuring that a viscosity at 25° C. of the component (D) is within a range of preferably not less than 0.5 mPa·s, more preferably not less than 5 mPa·s, further preferably not less than 10 mPa·s, especially preferably not less than 50 mPa·s, and preferably not more than 1,000,000 mPa·s, more preferably not more than 500,000 mPa·s, further preferably not more than 100,000 mPa·s, especially preferably not more than 10,000 mPa·s.

Examples of the siloxane compound (D1) are, for instance, as follows. In the formulas, Vi represents $CH_2CH—$, Me represents $CH_3—$, Hex represents $CH_2CHCH_2CH_2CH_2CH_2—$, Met represents $CH_2C(CH_3)C(O)OCH_2CH_2CH_2—$, and PE represents $HO(CH_2CH_2O)_{10}CH_2CH_2CH_2—$.

Examples of the siloxane compound (D2) are, for instance, as follows.

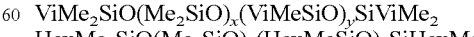
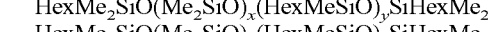
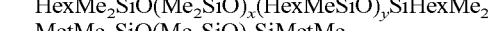
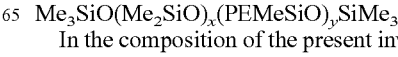

In the composition of the present invention, the amount of siloxane compound (D) is within a range from 0.001 to 20 parts by mass, preferably from 0.005 to 15 parts by mass, especially preferably from 0.01 to 10 parts by mass per 100 parts by mass of the fluorine-containing polymer (A). This is because if the amount of siloxane compound (D) is less than the lower limit of the above-mentioned range, there is a tendency that the effect of the present invention cannot be exhibited sufficiently, and on the contrary, if the amount exceeds the upper limit, weather resistance and mechanical properties of the obtained coating film tend to be lowered.

The composition of the present invention may contain a reaction inhibitor, for example, acetylene alcohol such as 1-ethynyl-1-cyclohexanol, 2-ethynylisopropanol, 2-methyl-3-butyn-2-ol, 3,5-dimethyl-1-hexyn-3-ol or 2-phenyl-3-butyn-2-ol; alkenylsiloxane such as 1,3,5,7-tetravinyltetramethylcyclotetrasiloxane; maleate compound such as diallyl fumarate, dimethyl fumarate or diethyl fumarate; triallyl cyanurate or triazole. By blending a reaction inhibitor, there can be exhibited an effect that one component composition is obtained and pot life of the obtained composition can be extended sufficiently long. The content of this reaction inhibitor is not limited particularly, and is preferably from 10 to 50,000 ppm in mass unit in the composition of the present invention.

In addition, the composition of the present invention may contain a solvent as component (E). The use of solvent (E) improves workability in coating work and is advantageous from the viewpoint that appearance of the obtained coating film becomes satisfactory. Examples of the solvent (E) usable on the composition of the present invention are esters such as methyl acetate, ethyl acetate, propyl acetate, n-butyl acetate and tert-butyl acetate; ketones such as acetone, methyl ethyl ketone and cyclohexanone; aliphatic hydrocarbons such as hexane, cyclohexane, octane, nonane, decane, undecane, dodecane and mineral spirit; aromatic hydrocarbons such as benzene, toluene, xylene, naphthalene and solvent naphtha; alcohols such as methanol, ethanol, tert-butanol, iso-propanol and ethylene glycol monoalkyl ether; cyclic ethers such as tetrahydrofuran, tetrahydropyran and dioxane; dimethyl sulfoxide and mixtures thereof.

The curable fluorine-containing polymer composition of the present invention can be formed into a coating composition as it is or by blending additives. Examples of additives are usual additives for coating composition, for instance, a pigment, pigment dispersant, thickener, leveling agent, defoaming agent, film forming auxiliary, ultraviolet absorber, HALS (photostabilizer), delustering agent, filler, colloidal silica, antifungal agent, silane coupling agent, antiskinning agent, antioxidant, flame retardant, antisagging agent, antistatic agent and rust inhibitor.

The curable fluorine-containing polymer composition and coating composition of the present invention are cured rapidly at relatively low temperature by hydrosilylation reaction, and the obtained cured article has high weather resistance and is excellent in stain-proofing property, chemical resistance, optical properties, mechanical properties, adhesion to a substrate and resistance to yellowing due to heat. The curable fluorine-containing polymer composition and coating composition can be used as a coating composition for indoor use for building material and interior materials and for outdoor use for building materials, automobiles, airplanes, ships and trains and can be coated directly onto metal, concrete and plastic or onto undercoat paints such as wash primer, rust-preventive coating, epoxy coating, acrylic coating and polyester resin coating. Further, the curable fluorine-containing polymer composition and coating composition can be used as a sealing compound and a film forming agent.

EXAMPLE

The curable fluorine-containing polymer composition of the present invention is then explained by means of examples and comparative examples. Measuring methods referred to in examples are as follows.

(NMR Analysis)
NMR measuring equipment: Equipment available from BRUKER
$^1$H-NMR measuring condition: 300 MHz (tetramethylsilane=0 ppm)
$^{19}$F-NMR measuring condition: 282 MHz (trichlorofluoromethane=0 ppm)
(Elemental Analysis)
Measuring equipment: CHN CORDER available from J-SCIENCE CO., LTD. and Ionalyzer 901 available from Orio Research Co., Ltd.
(Infrared Absorption (IR) Analysis)
Measuring equipment: Equipment available from Perkin Elmer Co., Ltd.
Measuring condition: A reactive solution is coated on a NaCl plate, and after drying, spectrum analysis is conducted in a region of from 4,000 cm$^{-1}$ to 400 cm$^{-1}$.
(Hydroxyl Value and Acid Value)
Hydroxyl value and acid value are calculated from a composition obtained by NMR and elemental analysis.
(Number Average Molecular Weight)
Measuring equipment: GPC (model HLC-8020) available from Toso Co., Ltd.
Measuring condition: Three TSKgel:GMHXL columns, one G2500HXL column and one GRCXL-L column are used. Tetrahydrofuran is used as an eluate, and polystyrene of which molecular weight is known is used as a standard sample for measurement of a number average molecular weight.
(Glass Transition Temperature Tg)
A glass transition temperature Tg is determined by a center point method at $2^{nd}$ run by using DSC measuring equipment 7 Series available from Perkin Elmer Co., Ltd. according to ASTM E1356-98.
Measuring Conditions
Temperature increasing rate: 10° C./min
Amount of sample: 10 mg
Heat cycle: 25° C. to 150° C., heating up, cooling, heating up Also, pencil hardness and bending property of a coating film are evaluated as follows.
(Pencil Hardness)
Pencil hardness is evaluated according to JIS K5600.
(Bending Property)
Bending property of a coating film is evaluated according to the following criteria by bending a coated plate by 180 degrees according to the T-bend test method. Figures on the left of T indicate a value obtained by subtracting 1 from the number of bending cycles.
0T: bending once
1T: bending twice
2T: bending three times
3T: bending four times Synthesis Example 1

Into a 6,000 ml stainless steel autoclave were poured 2,500 g of n-butyl acetate, 520.5 g of VeoVa9 (registered trade mark) (hereinafter referred to as "VV9") and 129.5 g of 4-hydroxybutyl vinyl ether (HBVE), and after cooling to 5° C., evacuation and replacing of the inside of autoclave with nitrogen gas were repeated three times. Then the autoclave was evacuated again and 492.0 g of tetrafluoroethylene (TFE) was introduced. While stirring, the autoclave was heated up to 62.0° C., and 28.38 g of PERBUTYL PV (trade name, peroxide polymerization initiator available from NOF Corporation) was introduced to initiate polymerization. When the inside pressure of the autoclave decreased from 1.5 MPaG to 0.4 MPaG, the reaction was stopped. Polymerization yield was 98.0%. According to $^{19}$F-NMR, $^{1}$H-NMR and elemental analyses, the obtained fluorine-containing polymer was a fluorine-containing copolymer (1) comprising 47% by mole of a recurring unit derived from TFE and represented by the formula:

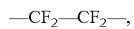

38% by mole of a recurring unit derived from VV9 and represented by the formula:

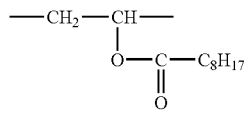

and 15% by mole of a recurring unit derived from HBVE and represented by the formula:

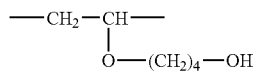

and the number average molecular weight Mn thereof was 11.0×1,000. Its glass transition temperature Tg was 30° C., and its hydroxyl value was 63 mgKOH/g.

Next, into a 300 ml four-necked flask equipped with a stirrer and subjected to replacement of the inside thereof with nitrogen gas were charged 188.5 g of n-butyl acetate solution of the obtained fluorine-containing copolymer (1) and 5.25 g of allyl isocyanate. Then the solution was maintained for about 20 hours with stirring at 80° C. to adjust its concentration and obtain a n-butyl acetate solution comprising 40% by mass of a fluorine-containing polymer (I) comprising 47% by mole of a recurring unit represented by the formula:

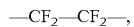

38% by mole of a recurring unit represented by the formula:

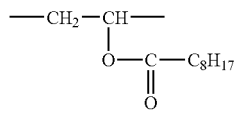

and 15% by mole of a recurring unit represented by the formula:

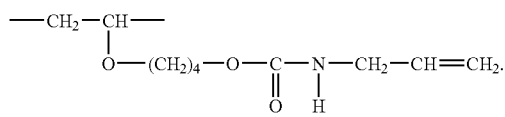

Synthesis Example 2

Into a 6,000 ml stainless steel autoclave were poured 2,500 g of n-butyl acetate, 493.5 g of vinyl pivalate (VPi) and 133.7 g of 4-hydroxybutyl vinyl ether (HBVE), and after cooling to 5° C., evacuation and replacing of the inside of autoclave with nitrogen gas were repeated three times. Then the autoclave was evacuated again and 201 g of isobutylene (IB) and 467.1 g of tetrafluoroethylene (TFE) were introduced. While stirring, the autoclave was heated up to 80.0° C., and 36.0 g of PERBUTYL 355 (trade name, peroxide polymerization initiator available from NOF Corporation) was introduced to initiate polymerization. When the inside pressure of the autoclave decreased from 2.0 MPaG to 0.4 MPaG, the reaction was stopped. Polymerization yield was 98.0%. According to $^{19}$F-NMR, $^{1}$H-NMR and elemental analyses, the obtained fluorine-containing polymer was a fluorine-containing copolymer (2) comprising 47.0% by mole of a recurring unit derived from TFE and represented by the formula:

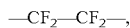

40.8% by mole of a recurring unit derived from VPi and represented by the formula:

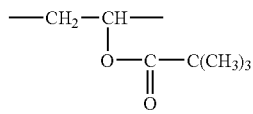

and 12.2% by mole of a recurring unit derived from HBVE and represented by the formula:

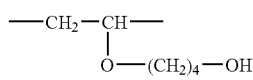

and the number average molecular weight Mn thereof was 12.0×1,000. Its glass transition temperature Tg was 32° C., and its hydroxyl value was 60 mgKOH/g.

Next, into a 300 ml four-necked flask equipped with a stirrer and subjected to replacement of the inside thereof with nitrogen gas were charged 188.6 g of n-butyl acetate solution of the obtained fluorine-containing copolymer (2), 23.9 g of n-butyl acetate and 5.0 g of allyl isocyanate. Then the solution was maintained for about 20 hours with stirring at 80° C. to adjust its concentration and obtain a n-butyl acetate solution comprising 40% by mass of a fluorine-containing polymer (II) comprising 47% by mole of a recurring unit represented by the formula:

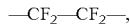

40.8% by mole of a recurring unit represented by the formula:

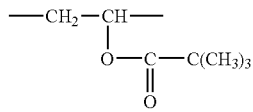

and 12.2% by mole of a recurring unit represented by the formula:

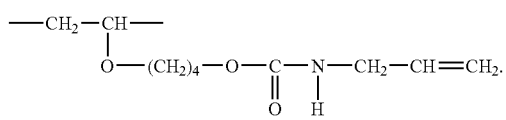

Synthesis Example 3

Into a 100 ml three-necked flask was poured 50 g of an aqueous solution containing 20% by mass of NaCl, and the flask was cooled to −15° C. By adding 1.05 g of Na₂O₂ thereto, the solution temperature was increased to −10° C. The flask was cooled again to −15° C., and 4.91 g of a compound represented by the formula:

$$(CH_3)_3C-OCH_2CF_2COCl$$

was added thereto dropwise. After completion of the addition, stirring was continued for 30 minutes while cooling to −15° C. Then thereto was added 5.0 ml of 1,1,2-trichloro-1,2,2-trifluoroethane cooled to −15° C., followed by stirring for another 30 minutes. Since the solution was separated into two layers immediately after allowing to stand, a white suspension of the lower layer was collected and 6.0 ml of a solution was obtained. The concentration of the peroxide determined by an iodometric titration method was 134 mg/ml.

A 100 ml stainless steel reactor was cooled to −50° C., and thereto was poured 4.6 ml of 1,1,2-trichloro-1,2,2-trifluoroethane solution of the above peroxide. After the inside of the reactor was replaced by nitrogen gas, 10.9 g of hexafluoropropylene and 6.5 g of vinylidene fluoride were introduced. Then the stainless steel reactor was subjected to shaking at 20° C. for 2.5 hours to carry out polymerization. The inside pressure of the stainless steel reactor was decreased from 1.28 MPa·G to 1.17 MPa·G. After completion of the polymerization, by evaporation of unreacted monomer and 1,1,2-trichloro-1,2,2-trifluoroethane, 4.2 g of a liquid polymer (a) was obtained. According to NMR analysis, a molar ratio of a recurring unit derived from vinylidene fluoride and represented by the formula:

$$-CH_2-CF_2-,$$

to a recurring unit derived from hexafluoropropylene and represented by the formula:

$$-CF_2-CF(CF_3)-$$

was 76.5:23.5.

To the obtained liquid polymer (a) was added the same mass of trifluoroacetic acid, followed by 2-hour heating at 70° C. After completion of reaction, washing with water and then drying were carried out to obtain 3.5 g of a liquid polymer (b). As a result of NMR and IR analyses, it was found that in the liquid polymer (b), a tert-butoxy group at an end of the liquid polymer (a) had been converted to hydroxyl group.

To 3.5 g of the obtained liquid polymer (b) was mixed 1.0 g of allyl isocyanate, followed by 24-hour reaction at normal temperature and then heating to 100° C. to complete the reaction. Further, excessive allyl isocyanate was removed by evaporation by heating at 100° C. under reduced pressure to prepare a fluorine-containing polymer (III). As a result of NMR and IR analyses, it was found that the both ends of its main chain had been converted from hydroxyl groups to allyl groups. The fluorine-containing polymer (III) was one having flowability at normal temperature, and its number average molecular weight was 5,400.

Example 1

To 100 parts by mass of n-butyl acetate solution containing 40% by mass of the fluorine-containing polymer (II) prepared in Synthesis Example 2 were added 6.0 parts by mass of a siloxane compound represented by an average unit formula:

$$\{H(CH_3)_2SiO_{1/2}\}_{0.6}(C_6H_5SiO_{3/2})_{0.4}$$

(an amount giving 1.0 mole of hydrogen atom bonded to silicon atom of this component per one mole of allyl group in the fluorine-containing polymer (II)), 1,3-divinyltetramethyldisiloxane solution of 1,3-divinyltetramethyldisiloxane complex of platinum (an amount giving 50 ppm of platinum atom per the mass of the whole composition), and 0.2 or 0.5 part by mass of a siloxane compound shown in Table 1, followed by sufficiently mixing to prepare curable fluorine-containing polymer compositions.

These curable fluorine-containing polymer compositions were coated on an aluminum sheet (JIS H4000A-1050P AM-713, 0.2 mm thick) by Mayer Rod coating, and the coated sheet was dried for curing at 150° C. for 15 minutes with a blast dryer to produce a coated sheet having about 20 μm thick coating film. Pencil hardness and bending property of this coated sheet were evaluated. In addition, these compositions were coated on a float sheet glass (JIS R3202, 0.5 mm thick), and the coated sheet was dried for curing at 150° C. for 20 minutes with a hot air dryer to produce a coated sheet having about 20 μm thick coating film. By using this coated sheet, property of preventing scribbling was evaluated according to ASTM D6578.

(1) Marking was made on an area of 3 cm×3 cm square using a blue marker, and cissing was evaluated by the following five grades.
1: There is no cissing at all.
2: Cissing area is less than 30%.
3: Cissing area is not less than 30% and less than 60%.
4: Cissing area is not less than 60% and less than 80%.
5: Cissing area is not less than 80%.
(2) Then after the blue making was dried completely, the marking was wiped off with 25 strokes, using a sponge on which dry paper was wound.
(3) Color difference (dE*) before and after the wiping was measured to evaluate property of wiping off the marking.
(4) Further, when the above steps (1) to (3) were repeated and marking was made three times and five times, respectively, cissing and wipe-off property (dE*) were evaluated.

The results are shown in Table 1.

In Table 1, the respective D components a to h are the following siloxane compounds. Symbols in the table are Vi: CH₂CH—, Me: CH₃—, Hex: CH₂CHCH₂CH₂CH₂CH₂—, Met: CH₂C(CH₃)C(O)OCH₂CH₂CH₂—.

a: Siloxane compound represented by the formula:

$$ViMe_2SiO(Me_2SiO)_{10}SiViMe_2$$

having a viscosity of 4.5 mPa·s at 25° C.

b: Siloxane compound represented by the formula:

$$ViMe_2SiO(Me_2SiO)_{80}SiViMe_2$$

having a viscosity of 370 mPa·s at 25° C.

c: Siloxane compound represented by the formula:

$$ViMe_2SiO(Me_2SiO)_{160}SiViMe_2$$

having a viscosity of 2,000 mPa·s at 25° C.

d: Siloxane compound represented by the formula:

$$ViMe_2SiO(Me_2SiO)_{70}(ViMeSiO)_2SiViMe_2$$

having a viscosity of 350 mPa·s at 25° C.

e: Siloxane compound represented by the formula:

$$HexMe_2SiO(Me_2SiO)_x(HexMeSiO)_ySiHexMe_2$$

having a viscosity of 420 mPa·s at 25° C.

f: Siloxane compound represented by the formula:

$$HexMe_2SiO(Me_2SiO)_x(HexMeSiO)_ySiHexMe_2$$

having a viscosity of 220 mPa·s at 25° C.

g: Siloxane compound represented by the formula:

$$MetMe_2SiO(Me_2SiO)_xSiMetMe_2$$

having a viscosity of 100 mPa·s at 25° C.

h: Siloxane compound represented by the formula:

$$MetMe_2SiO(Me_2SiO)_xSiMetMe_2$$

having a viscosity of 350 mPa·s at 25° C.

TABLE 1

| Component D | Adding amount (part by mass) | Pencil hardness | Bending property | Cissing marked once | Cissing marked 3 times | Cissing marked 5 times | Wipe-off property (dE*) marked once | Wipe-off property (dE*) marked 3 times | Wipe-off property (dE*) marked 5 times |
| --- | --- | --- | --- | --- | --- | --- | --- | --- | --- |
| a | 0.2 | 2H | 0T | 3 | 3 | 3 | 1.2 | 18.9 | 23.4 |
|   | 0.5 | 2H | 0T | 4 | 3 | 3 | 0.9 | 1.7 | 4.1 |
| b | 0.2 | 2H | 0T | 4 | 5 | 4 | 0.8 | 0.5 | 1.0 |
|   | 0.5 | 2H | 0T | 5 | 5 | 5 | 0.3 | 0.8 | 1.0 |
| c | 0.2 | 2H | 0T | 4 | 3 | 4 | 0.8 | 0.8 | 1.1 |
|   | 0.5 | 2H | 0T | 4 | 3 | 4 | 0.2 | 0.9 | 1.5 |
| d | 0.2 | 2H | 0T | 4 | 3 | 3 | 1.1 | 1.1 | 1.3 |
|   | 0.5 | 2H | 0T | 4 | 3 | 3 | 1.0 | 1.0 | 1.3 |
| e | 0.2 | 2H | 0T | 3 | 3 | 3 | 1.2 | 1.3 | 1.7 |
|   | 0.5 | 2H | 0T | 3 | 4 | 4 | 1.4 | 1.2 | 1.5 |
| f | 0.2 | 2H | 0T | 4 | 3 | 3 | 1.3 | 1.2 | 1.6 |
|   | 0.5 | 2H | 0T | 4 | 3 | 3 | 1.0 | 0.7 | 1.0 |
| g | 0.2 | 2H | 0T | 4 | 3 | 3 | 1.4 | 1.4 | 1.7 |
|   | 0.5 | 2H | 0T | 5 | 4 | 3 | 1.7 | 1.4 | 1.6 |
| h | 0.2 | 2H | 0T | 5 | 4 | 3 | 1.4 | 1.2 | 1.4 |
|   | 0.5 | 2H | 0T | 5 | 4 | 4 | 0.4 | 0.9 | 1.4 |
| not added | — | 2H | 0T | 1 | not measured | not measured | 62.1 | not measured | not measured |

Example 2

To 100 parts by mass of n-butyl acetate solution containing 40% by mass of the fluorine-containing polymer (I) prepared in Synthesis Example 1 were added 6.0 parts by mass of a siloxane compound represented by an average unit formula:

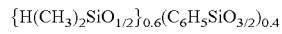

$\{H(CH_3)_2SiO_{1/2}\}_{0.6}(C_6H_5SiO_{3/2})_{0.4}$ (an amount giving 1.0 mole of hydrogen atom bonded to silicon atom of this component per one mole of allyl group in the fluorine-containing polymer (I)), 1,3-divinyltetramethyldisiloxane solution of 1,3-divinyltetramethyldisiloxane complex of platinum (an amount giving 50 ppm of platinum atom per the mass of the whole composition), and 0.2 part by mass of the siloxane compound b used in Example 1, followed by sufficiently mixing to prepare a curable fluorine-containing polymer composition.

By using this curable fluorine-containing polymer composition, a coated sheet was prepared in the same manner as in Example 1. Pencil hardness and bending property of this coated sheet were evaluated. In addition, the composition was coated on a float sheet glass pis R3202, 0.5 mm thick), and the coated sheet was dried for curing at 150° C. for 20 minutes with a hot air dryer to produce a coated sheet having about 20 µm thick coating film. By using this coated sheet, property of preventing scribbling was evaluated in the same manner as in Example 1 according to ASTM D6578. The results are shown in Table 2.

Example 3

To 100 parts by mass of n-butyl acetate solution containing 40% by mass of the fluorine-containing polymer (II) prepared in Synthesis Example 2 were added 5.0 parts by mass of a siloxane compound represented by the formula:

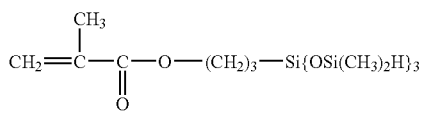

(an amount giving 1.0 mole of hydrogen atom bonded to silicon atom of this component per one mole of allyl group in the fluorine-containing polymer (II)), 1,3-divinyltetramethyldisiloxane solution of 1,3-divinyltetramethyldisiloxane complex of platinum (an amount giving 50 ppm of platinum atom per the mass of the whole composition), and 0.2 part by mass of the siloxane compound b used in Example 1, followed by sufficiently mixing to prepare a curable fluorine-containing polymer composition.

By using this curable fluorine-containing polymer composition, a coated sheet was prepared in the same manner as in Example 1. Pencil hardness and bending property of this coated sheet were evaluated. In addition, the composition was coated on a float sheet glass pis R3202, 0.5 mm thick), and the coated sheet was dried for curing at 150° C. for 20 minutes with a hot air dryer to produce a coated sheet having about 20 µm thick coating film. By using this coated sheet, property of preventing scribbling was evaluated in the same manner as in Example 1 according to ASTM D6578. The results are shown in Table 3.

TABLE 2

| Pencil hardness | Bending property | Cissing marked once | Cissing marked 3 times | Cissing marked 5 times | Wipe-off property (dE*) marked once | Wipe-off property (dE*) marked 3 times | Wipe-off property (dE*) marked 5 times |
| --- | --- | --- | --- | --- | --- | --- | --- |
| 2H | 0T | 4 | 3 | 3 | 1.4 | 1.5 | 1.7 |

TABLE 3

| Pencil hardness | Bending property | Cissing marked once | Cissing marked 3 times | Cissing marked 5 times | Wipe-off property (dE*) marked once | Wipe-off property (dE*) marked 3 times | Wipe-off property (dE*) marked 5 times |
|---|---|---|---|---|---|---|---|
| 2H | 0T | 4 | 4 | 3 | 1.2 | 1.5 | 1.6 |

INDUSTRIAL APPLICABILITY

There is provided a curable fluorine-containing polymer composition which is rapidly cured at relatively low temperature by hydrosilylation reaction to form a coating film having not only high hardness and flexibility but also water- and oil-repellency, thereby giving stain-proofing effect for a long period of time, especially maintaining property of removing and wiping-off stain.

The obtained cured coating film has high weather resistance and excellent in stain-proofing property, chemical resistance, optical properties, mechanical properties, adhesion to a substrate and resistance to yellowing due to heat, and in addition, has stain-proofing effect, especially property of removing and wiping-off stain.

The invention claimed is:

1. A curable fluorine-containing polymer composition comprising:
    (A) a fluorine-containing polymer comprising recurring unit derived from a fluorinated ethylenic monomer and recurring unit derived from an un-fluorinated ethylenic monomer, in which a part or the whole of the recurring units derived from the un-fluorinated ethylenic monomer are recurring unit represented by the formula:

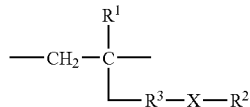

where $R^1$ is hydrogen atom or methyl group; $R^2$ is alkenyl group, aryl group having alkenyl group, or aralkyl group having alkenyl group; X is a group represented by —C(O)NH—; $R^3$ is a group represented by —O—, —O[CH($R^4$)]$_m$O—, —(CH$_2$)$_m$O—, —OC(O)—(CH$_2$)$_n$O— or —(CH$_2$)$_m$OC(O)—(CH$_2$)$_n$O—, where $R^4$ is —H, —OH, —CH$_2$OH or —O—X—$R^2$, and $R^2$ and X are as defined above; m is an integer of 1 to 10; n is an integer of 1 to 10,
    (B) a siloxane compound having hydrogen atom bonded to silicon atom,
    (C) a catalyst for hydrosilylation reaction, and
    (D) a siloxane compound having no hydrogen atom bonded to silicon atom,
    wherein an amount of hydrogen atom bonded to silicon atom in the siloxane compound (B) is 0.1 to 20 mole per 1 mole of the monovalent hydrocarbon group having ethylenic carbon-carbon double bond in the fluorine-containing polymer (A), an amount of catalyst (C) for hydrosilylation reaction is a catalytic amount, and an amount of siloxane compound (D) is 0.01 to 10 parts by mass per 100 parts by mass of the fluorine-containing polymer (A),
    wherein the siloxane compound (D) is at least one selected from the group consisting of a siloxane compound represented by the general formula (D1):

a siloxane compound represented by the general formula (D2):

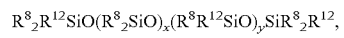

wherein $R^8$ is a monovalent hydrocarbon group having 1 to 10 carbon atoms and having no ethylenic carbon-carbon double bond;
   $R^{12}$ is alkenyl group; and each of x and y is a positive integer of not less than 1,
   wherein the fluorine-containing polymer (A) is a fluorine-containing polymer obtained by reaction of a fluorine-containing polymer (A1) comprising a recurring unit derived from a fluorinated ethylenic monomer and a recurring unit derived from an un-fluorinated ethylenic monomer, in which a part or the whole of said recurring unit derived from the un-fluorinated ethylenic monomer are recurring unit represented by the formula (A1):

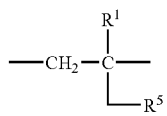

where $R^1$ is hydrogen atom or methyl group; $R^5$ is a group represented by —OH, —O[CH($R^6$)]$_m$OH, —(CH$_2$)$_m$OH, —OC(O)—(CH$_2$)$_n$OH or —(CH$_2$)$_m$OC(O)—(CH$_2$)$_n$OH, where $R^6$ is —H, —OH or —CH$_2$OH; m is an integer of 1 to 10; n is an integer of 1 to 10, with a compound represented by the formula:

where $R^2$ is alkenyl group, aryl group having alkenyl group, or aralkyl group having alkenyl group; Y is a group represented by —NCO, and
   wherein the fluorine-containing polymer (A1) is obtained by polymerizing a monomer giving the recurring unit of the formula (A1).

2. The curable fluorine-containing polymer composition of claim 1, wherein the recurring unit derived from the fluorinated ethylenic monomer in the fluorine-containing polymer (A) is a recurring unit derived from at least one monomer selected from the group consisting of tetrafluoroethylene, hexafluoropropylene, chlorotrifluoroethylene and trifluoroethylene.

3. The curable fluorine-containing polymer composition of claim 1, wherein the fluorine-containing polymer (A) comprises a recurring unit represented by the formula (1):

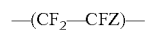

where Z is a group represented by —H, —Cl, —F or —CF$_3$, a recurring unit represented by the formula (2):

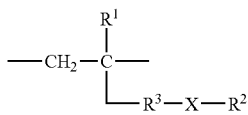

where $R^1$ is hydrogen atom or methyl group; $R^2$ is alkenyl group, aryl group having alkenyl group, or aralkyl group having alkenyl group; X is a group represented by —C(O)NH—; $R^3$ is a group represented by —O—, —O[CH($R^4$)]$_m$O—, —(CH$_2$)$_m$O—, —OC(O)—(CH$_2$)$_n$O— or —(CH$_2$)$_m$OC(O)—(CH$_2$)$_n$O—, where $R^4$ is —H, —OH, —CH$_2$OH or —O—X—$R^2$, and $R^2$ and X are as defined above; m is an integer of 1 to 10; n is an integer of 1 to 10, a recurring unit represented by the formula (3):

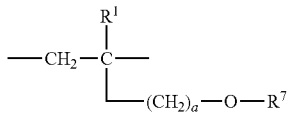

where $R^1$ is hydrogen atom or methyl group; a is 0 or 1; $R^7$ is hydrogen atom or a substituted or un-substituted monovalent hydrocarbon group having no ethylenic carbon-carbon double bond, a recurring unit represented by the formula (4):

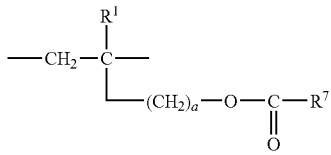

where $R^1$ is hydrogen atom or methyl group; a is 0 or 1; $R^7$ is hydrogen atom or a substituted or un-substituted monovalent hydrocarbon group having no ethylenic carbon-carbon double bond, a recurring unit represented by the formula (5):

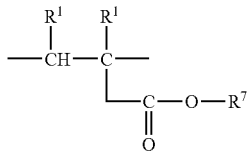

where $R^1$ s are the same or different and each is hydrogen atom or methyl group; $R^7$ is hydrogen atom or a substituted or un-substituted monovalent hydrocarbon group having no ethylenic carbon-carbon double bond, and a recurring unit represented by the formula (6):

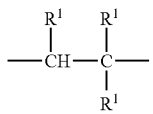

where $R^1$s are the same or different and each is hydrogen atom or methyl group, and when the amount of the whole recurring units constituting the fluorine-containing polymer (A) is assumed to be 100% by mole, the recurring unit of the formulas (1) is contained in an amount of 10 to 50% by mole, the recurring unit of the formulas (2) is contained in an amount of 1 to 50% by mole, the recurring unit of the formulas (3) is contained in an amount of 0 to 89% by mole, the recurring unit of the formulas (4) is contained in an amount of 0 to 89% by mole, the recurring unit of the formulas (5) is contained in an amount of 0 to 89% by mole, and the recurring unit of the formulas (6) is contained in an amount of 0 to 89% by mole.

4. The curable fluorine-containing polymer composition of claim 1, wherein the siloxane compound (B) is a siloxane compound having a diorganosiloxy group (b1) bonded to silicon atom and represented by the formula:

—O—SiR$^8_2$H where $R^8$ is a monovalent hydrocarbon group having 1 to 10 carbon atoms and having no ethylenic carbon-carbon double bond.

5. The curable fluorine-containing polymer composition of claim 1, wherein the siloxane compound (B) is a siloxane compound (B1) represented by the formula:

$R^9_b Si(OR^{10})_{4-b}$ where $R^9$ is a substituted or un-substituted monovalent hydrocarbon group, an organic group having (meth)acryl group or an organic group having epoxy group; $R^{10}$ is a monovalent hydrocarbon group having no ethylenic carbon-carbon double bond or a diorganosilyl group (b2) represented by the formula:

—SiR$^8_2$H where $R^8$ is a monovalent hydrocarbon group having 1 to 10 carbon atoms and having no ethylenic carbon-carbon double bond; at least two $R^{10}$s in one molecule are the diorganosilyl groups (b2) defined above; b is 0 or an integer of 1 to 2.

6. The curable fluorine-containing polymer composition of claim 1, wherein the siloxane compound (B) is a siloxane compound (B2) represented by the formula:

$R^9_{c1}(R^{10}O)_{3-c1}Si$—$R^{11}$—$SiR^9_{c2}(OR^{10})_{3-c2}$ where $R^9$ is a substituted or un-substituted monovalent hydrocarbon group, an organic group having (meth)acryl group or an organic group having epoxy group; $R^{10}$ is a monovalent hydrocarbon group having no ethylenic carbon-carbon double bond or a diorganosilyl group (b2) represented by the formula:

—SiR$^8_2$H where $R^8$ is a monovalent hydrocarbon group having 1 to 10 carbon atoms and having no ethylenic carbon-carbon double bond; at least two $R^{10}$s in one molecule are the diorganosilyl group (b2) defined above; $R^{11}$ is a divalent organic group; c1 is 0 or an integer of 1 to 3; c2 is 0 or an integer of 1 to 3; there is no case where both of c1 and c2 are 3.

7. The curable fluorine-containing polymer composition of claim 1, wherein the siloxane compound (B) is a siloxane compound (B3) represented by the average unit formula:

$(HR^8_2SiO_{1/2})_d(R^8SiO_{3/2})_e(SiO_{4/2})_f$ where $R^8$ is a monovalent hydrocarbon group having 1 to 10 carbon atoms and having no ethylenic carbon-carbon double bond; d is a positive number; e is 0 or a positive number; f is 0 or a positive number; d/(e+f) is from 0.5 to 1.9.

8. The curable fluorine-containing polymer composition of claim 1, further comprising a solvent (E).

9. A coating composition comprising the curable fluorine-containing polymer composition of claim 1.

* * * * *